(12) United States Patent
Dick

(10) Patent No.: US 11,215,158 B2
(45) Date of Patent: Jan. 4, 2022

(54) HIGH-RESOLUTION METHOD FOR CONTROLLING POWER IN AN INTERNAL COMBUSTION ENGINE

(71) Applicant: Fueltech Ltda, Porto Alegre (BR)

(72) Inventor: Anderson Frederico Dick, Porto Alegre (BR)

(73) Assignee: Fueltech Ltda, Porto Alegre (BR)

( * ) Notice: Subject to any disclaimer, the term of this patent is extended or adjusted under 35 U.S.C. 154(b) by 0 days.

(21) Appl. No.: 17/251,987

(22) PCT Filed: Jun. 12, 2019

(86) PCT No.: PCT/BR2019/000019
§ 371 (c)(1),
(2) Date: Dec. 14, 2020

(87) PCT Pub. No.: WO2019/237165
PCT Pub. Date: Dec. 19, 2019

(65) Prior Publication Data
US 2021/0262429 A1  Aug. 26, 2021

(30) Foreign Application Priority Data

Jun. 14, 2018 (BR) .......................... 1020180120786

(51) Int. Cl.
| | |
|---|---|
| *F02P 5/145* | (2006.01) |
| *F02P 5/06* | (2006.01) |
| *F02D 23/00* | (2006.01) |
| *F02P 5/00* | (2006.01) |

(52) U.S. Cl.
CPC .............. *F02P 5/145* (2013.01); *F02D 23/00* (2013.01); *F02P 5/00* (2013.01); *F02P 5/06* (2013.01)

(58) Field of Classification Search
CPC ...... F02P 5/145; F02P 5/06; F02P 5/00; F02D 23/00
USPC ............. 123/406.18, 406.23, 406.58, 406.59
See application file for complete search history.

(56) References Cited

U.S. PATENT DOCUMENTS

| | | |
|---|---|---|
| 4,509,488 A | 4/1985 | Foster |
| 6,880,525 B2 | 4/2005 | Geyer |
| 7,577,511 B1 | 8/2009 | Tripathi |
| 8,459,007 B2 * | 6/2013 | Maier ................... B60W 10/08 60/285 |

* cited by examiner

*Primary Examiner* — Hai H Huynh
(74) *Attorney, Agent, or Firm* — Scott Houtteman; Houtteman Law, LLC

(57) ABSTRACT

A power control method/process of an internal combustion engine employing a selective ignition delay, in which the process chooses, in real time, just before the ignition, whether the next cylinder should have its power reduced or not, in such a way that this choice at high speed, individualized by cylinder, guarantees a higher resolution in the power control, where the process has the following steps: vaporized air and fuel enters the combustion chamber of the cylinder; a piston compresses the air and fuel increasing their pressure; the ignition spark does not occur, keeping the gases in the combustion chamber unchanged; the inertia of the engine causes the piston to move, where the ignition spark occurs shortly thereafter, with reduced work generation; air and fuel still expanding are expelled through the exhaust valve.

5 Claims, 15 Drawing Sheets

INTAKE  COMPRESSION  IGNITION  EXPANSION  EXHAUST

INTAKE  COMPRESSION  IGNITION  EXPANSION  EXHAUST

INTAKE  COMPRESSION  NO IGNITION  EXPANSION  EXHAUST

INTAKE  COMPRESSION  NO IGNITION  EXPANSION  EXHAUST

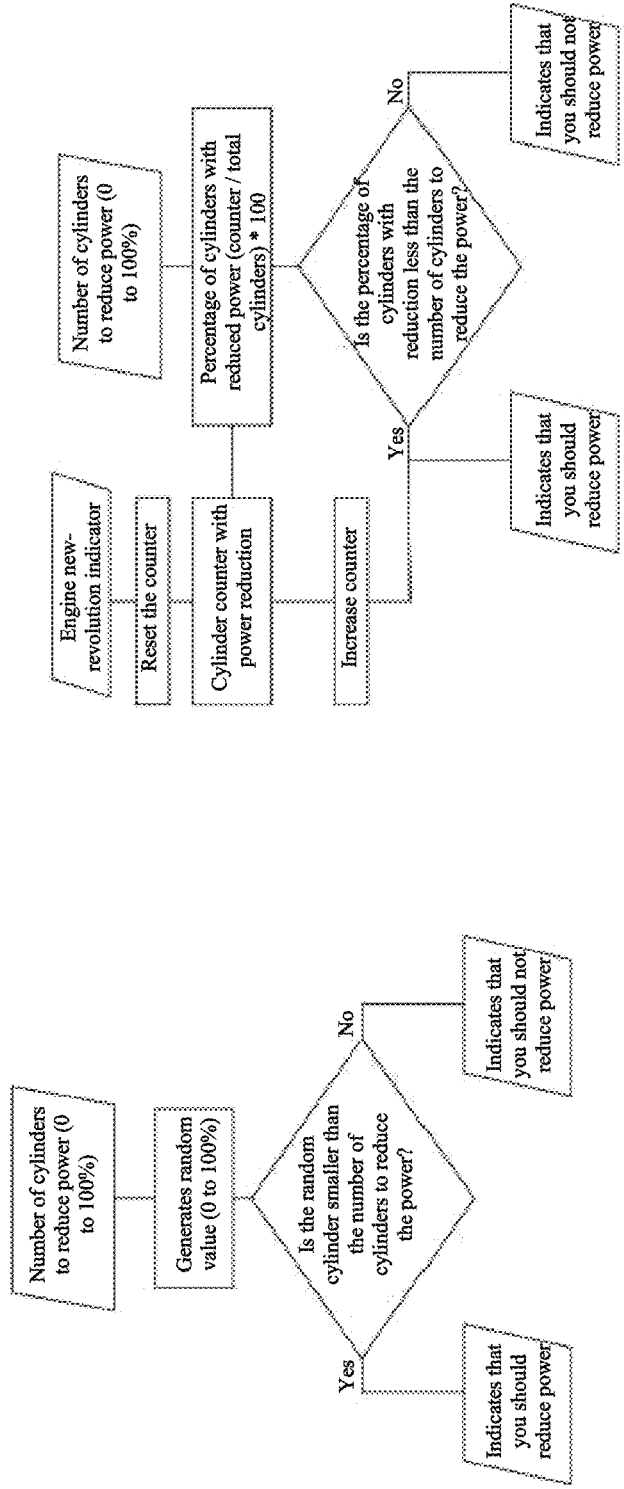

| Time in seconds (from the start of the power reduction) | Cut-off method | | High resolution method | |
|---|---|---|---|---|
| | Inlet pressure (bar) | Inlet pressure rate (bar/sec) | Inlet pressure (bar) | Inlet pressure rate (bar/sec) |
| 0.00 | -0.04 | | -0.04 | |
| 0.50 | 0.01 | 0.10 | 0.02 | 0.12 |
| 1.00 | 0.04 | 0.06 | 0.1 | 0.16 |
| 1.50 | 0.09 | 0.10 | 0.18 | 0.16 |
| 2.00 | 0.12 | 0.06 | 0.31 | 0.26 |
| 2.50 | 0.20 | 0.16 | 0.46 | 0.3 |
| 3.00 | 0.26 | 0.12 | 0.71 | 0.5 |
| 3.50 | 0.36 | 0.20 | - | - |
| 4.00 | 0.51 | 0.30 | - | - |
| 4.50 | 0.63 | 0.24 | - | - |

| Time in seconds (from the start of the power reduction) | Cut-off method | | High resolution method | |
|---|---|---|---|---|
| | Average cylinder temperature (°C) | Average temperature rate (°C/sec) | Average cylinder temperature (°C) | Average temperature rate (°C/sec) |
| 0.00 | 479.00 | | 501.5 | |
| 0.50 | 479.00 | 0.00 | 510 | 17 |
| 1.00 | 463.00 | -32.00 | 527.5 | 35 |
| 1.50 | 478.00 | 30.00 | 549 | 43 |
| 2.00 | 436.50 | -83.00 | 593 | 88 |
| 2.50 | 457.50 | 42.00 | 620.5 | 55 |
| 3.00 | 474.00 | 33.00 | 663.5 | 86 |
| 3.50 | 489.50 | 31.00 | - | - |
| 4.00 | 508.00 | 37.00 | - | - |
| 4.50 | 516.00 | 16.00 | - | - |

HIGH-RESOLUTION METHOD FOR CONTROLLING POWER IN AN INTERNAL COMBUSTION ENGINE

BACKGROUND OF THE INVENTION

The following specification refers to the method/process of power control of an internal combustion engine employing the selective ignition delay, in which the process chooses, in real time, just before the ignition, whether the next cylinder must have its power reduced or not, in such a way that this choice at high speed, individualized by cylinder, guarantees a higher resolution in the power control.

DESCRIPTION OF THE STATE OF THE ART

Currently, the power control of combustion engines is performed by cutting the ignition spark. This cut-off causes no combustion to happen in the engine cylinder, this interruption of combustion within the cycle leads to waste of energy, since the fuel and air are discarded without being used. In addition, the unused fuel cools the combustion chamber as it is at a lower temperature than the combustion chamber under normal operation. So you have the following problems with the current method:

Cylinders without ignition discard their full energy potential;

There is no progression of power generation per cylinder, or it is turned on (with spark, 100% energy), or it is turned off (without spark, 0% energy);

Cylinders without ignition do not contribute to the pressurization process of the turbocharger, reducing the efficiency of the engine, behaving like an engine with fewer cylinders as an analogy.

Residual fuel and air from cylinders without ignition cause the temperature drop of the spark plugs and the combustion chamber, encouraging failures in the following cycles as they are in inadequate temperature conditions for the next combustion.

The temperature drop, caused by the previous item, needs several seconds to be reestablished after the end of the ignition cut.

Increased engine rotation vibration, with the combustion cut-off randomly from cylinders, the engine behaves like an unbalanced engine, causing negative vibration effects and consequently mechanical breaks.

Disproportionate and inhomogeneous application of power, related to the vibration mentioned in the previous item, causes an increase in the mechanical stress of parts such as crankshafts, connecting rods and the engine block.

U.S. Pat. No. 6,880,525 discloses that an ignition switch is activated by an electronic control circuit that closes the ignition switch depending on the angle of the crankshaft and additional operational parameters, such as the engine RPM to trigger the ignition spark by crankshaft revolution. To limit the RPM, the ignition switch is kept open, when a predetermined final RPM is exceeded, in order to suppress an ignition spark in at least one crankshaft rotation. To prevent additional vibrations from being excited by the RPM limitation, the ignition switch is closed after a final RPM is exceeded according to the random principle and depending on the crankshaft position, in such a way that an ignition spark, which corresponds to a crankshaft revolution is triggered according to the random principle.

U.S. Pat. No. 7,577,511 discloses that an engine is controlled to operate in a variable travel mode. In variable travel mode, fuel is not delivered to the working chambers (e.g., cylinders) during the selected "skipped" duty cycles. During active ("non-skipped") duty cycles, a maximum (e.g., non-rectified) air and an optimized amount of fuel is delivered to the relevant work chambers so that the firing chambers can operate more efficiently close to their ideal efficiency. A controller is used to dynamically determine the chamber fires necessary to provide the engine torque based on the operating state and current conditions of the engine. Chamber fires can be sequenced in real time or near real time, in order to help reduce unwanted engine vibrations.

A process for intermittent control of an internal combustion engine that operates cyclically, in which, in the succession of work cycles, the work strokes are ignored—in approximately uniform distribution—and the number of skips is varied depending on the cargo, is described in U.S. Pat. No. 4,509,488. The fuel is fed in a controlled manner only to the working chambers of the internal combustion engine that do not cut, regardless of the load in a constant amount ideal for consumption. For a sensitive power distribution, especially in the low load range, the number of skips is varied chronologically, at least approximately randomly and regardless of speed, that is, the temporal density of the work strokes is varied. This can be done by defining different and finely scaled trigger patterns or by a stochastic ignition setting.

PROBLEMS OF THE STATE OF THE ART

The use of random processes to control the ignition of a vehicle is used to control the RPM of this vehicle, in order to avoid the vibrations that are felt, when a certain RPM is exceeded. In this way, the random selection principle that cuts the fuel is activated.

However, this type of random management does not allow power control in a turbo system, so that this choice at high speed, individualized by cylinder, guarantees a higher resolution in power control.

DESCRIPTION OF THE INVENTION

The novelty of the creation is the introduction of a power control method, where there is no waste of energy and side effects caused by the ignition spark cut, ensuring that all cylinders will always consume the injected air and fuel and generate work because of it. The new method consists of changing the moment when the ignition spark happens (ignition point), changing it after the point of maximum compression of the cylinder (PMS—Upper Dead Center). Although the ignition delay is currently used, the novelty is to apply this delay differently for each engine cylinder. The new method chooses, in real time, just before ignition, whether the next cylinder should have its power reduced or not. This choice at high speed, and individualized by cylinder, ensures that the proposed method has a higher resolution in power control.

DESCRIPTION OF THE DRAWINGS

The characterization of this invention is made through representative figures of the power control method/process of an internal combustion engine employing the selective ignition delay, in such a way that the product can be fully reproduced by appropriate technique, allowing full characterization of the requested object's functionality.

Based on the figures elaborated that express the best or preferential embodiment of the product idealized herein, the descriptive part of the report is based, through a detailed and consecutive numbering, where it clarifies aspects that may be implied by the adopted representation, in order to clearly determine the protection sought herein.

These figures are merely illustrative, and may vary, as long as they do not deviate from what was initially claimed.

Figure 2:
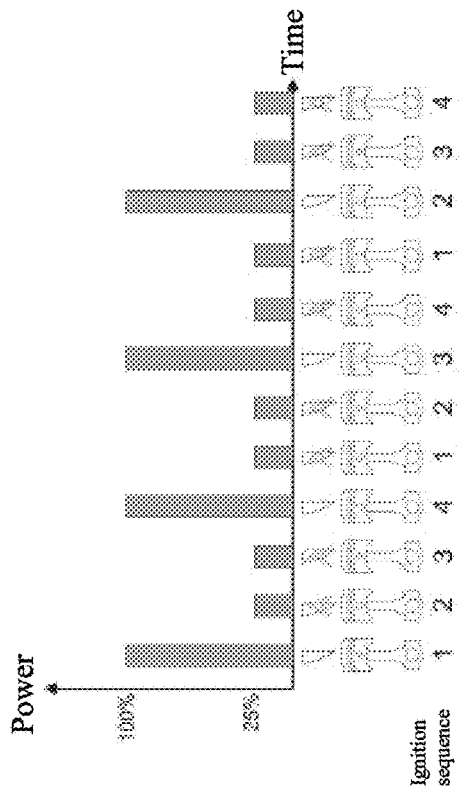
Figure 1:
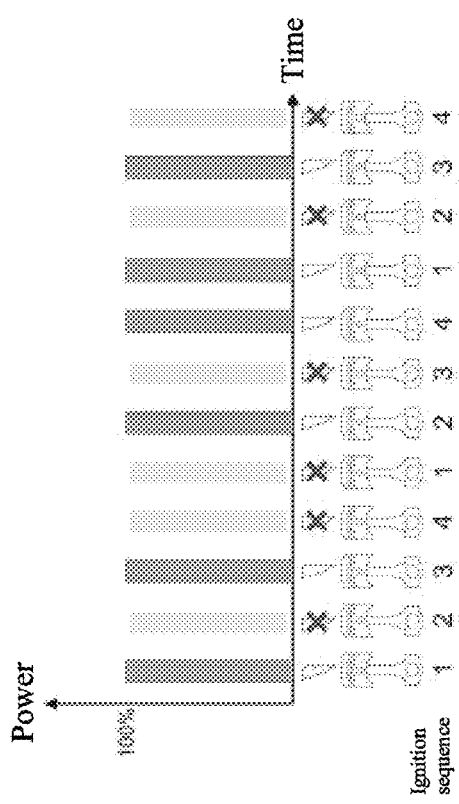
Figure 3:
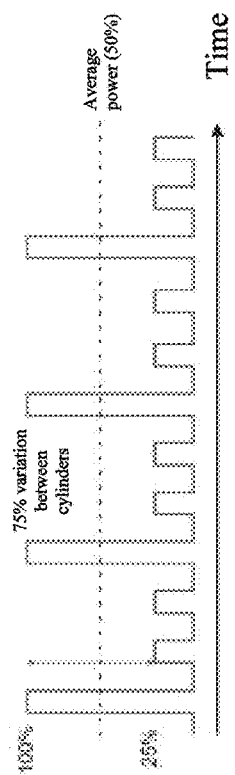
Figure 4:
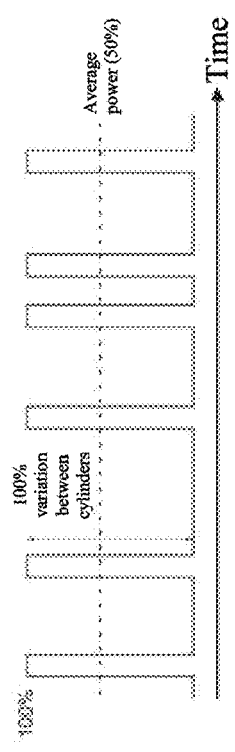
Figure 5:
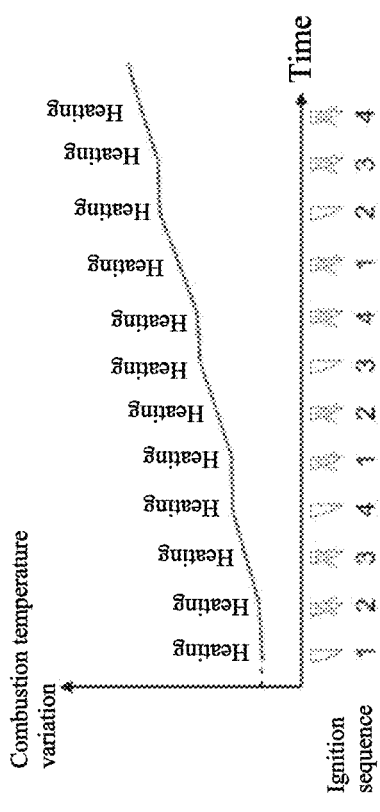
Figure 6:
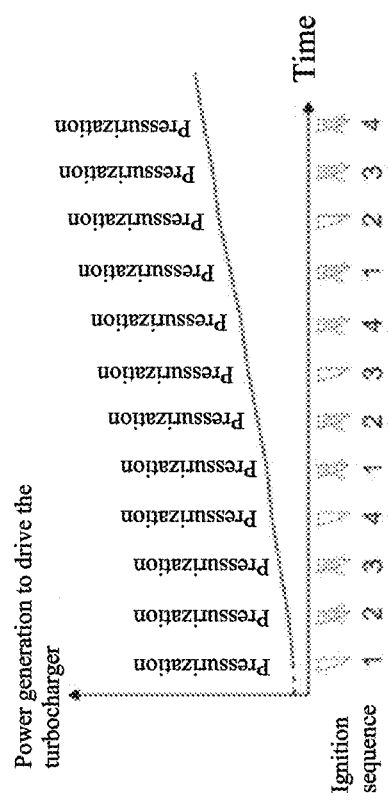
Figure 7:
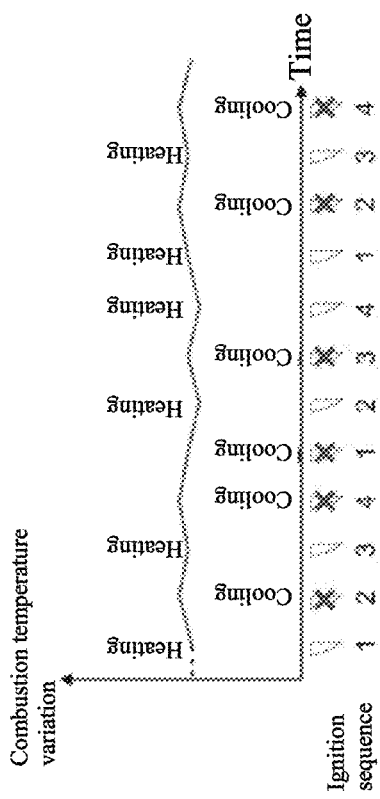
Figure 8:
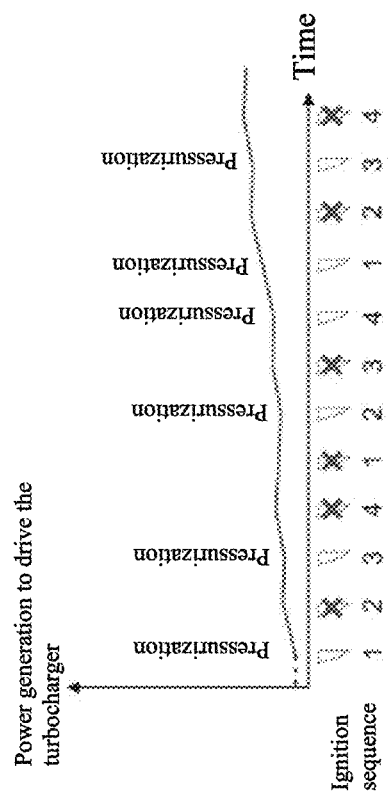
Figure 10:
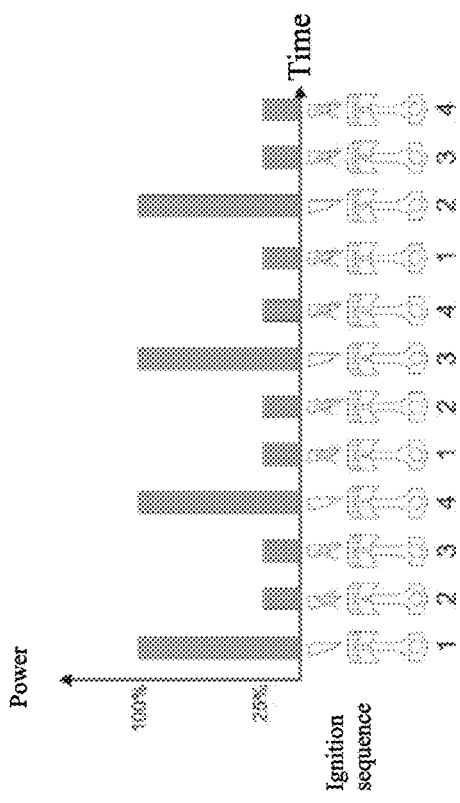
Figure 9:
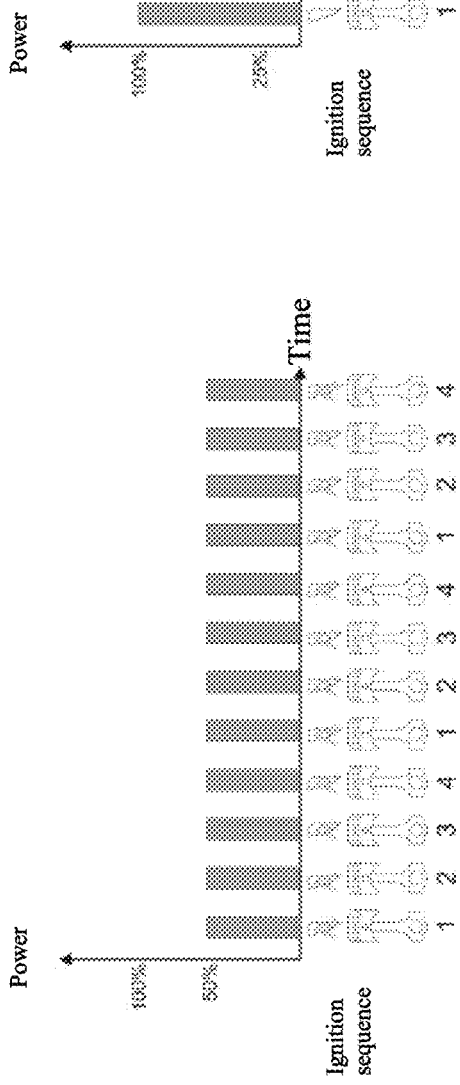

In this case, we have the following:

FIG. 1 show the cut-off power reduction method on a four-cylinder engine and the high-resolution power cut-off method on a four-cylinder engine of the state of the art;

FIG. 2 show the cut-off power reduction method on a four-cylinder engine and the high-resolution power cut-off method on a four-cylinder engine of the invention;

FIG. 3 show the cut-off power reduction method on a four-cylinder engine and the high-resolution power cut-off on a four-cylinder engine of the state of the art;

FIG. 4 show a comparison between the cut-off power reduction method on a four-cylinder engine and the high-resolution power cut-off method on a four-cylinder engine of the invention;

FIG. 5 show the cut-off power reduction method on a four-cylinder engine and the high-resolution power cut-off method on a four-cylinder engine of the state of the art;

FIG. 6 show a comparison between the cut-off power reduction method on a four-cylinder engine and the high-resolution power cut-off method on a four-cylinder engine of the invention;

FIG. 7 show the cut-off power reduction method on a four-cylinder engine and the high-resolution power cut-off method on a four-cylinder engine of the state of the art;

FIG. 8 show a comparison between the cut-off power reduction method on a four-cylinder engine and the high-resolution power cut-off method on a four-cylinder engine of the invention;

FIG. 9 show the cut-off reduction method on a four-cylinder engine and the high-resolution power cut-off method on a four-cylinder engine of the state of the art;

FIG. 10 show a comparison between the cut-off power reduction method on a four-cylinder engine and the high-resolution power cut-off method on a four-cylinder engine of the invention.

Figure 12:
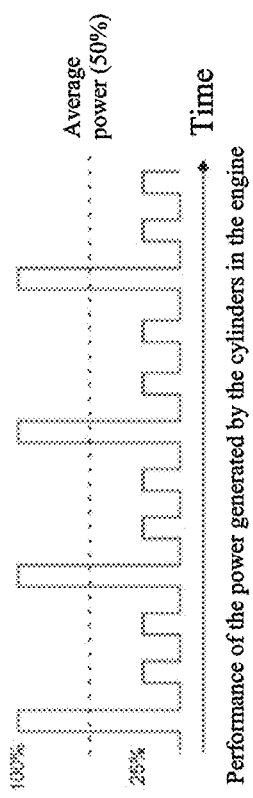
Figure 11:
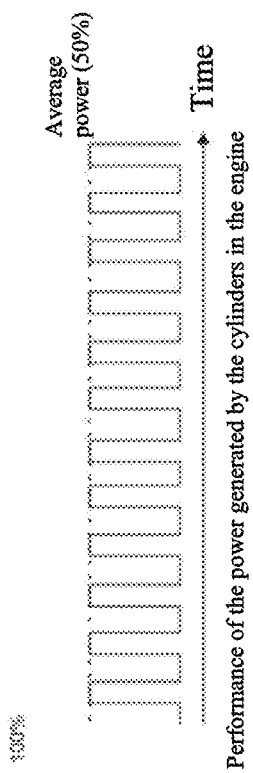
Figure 13:
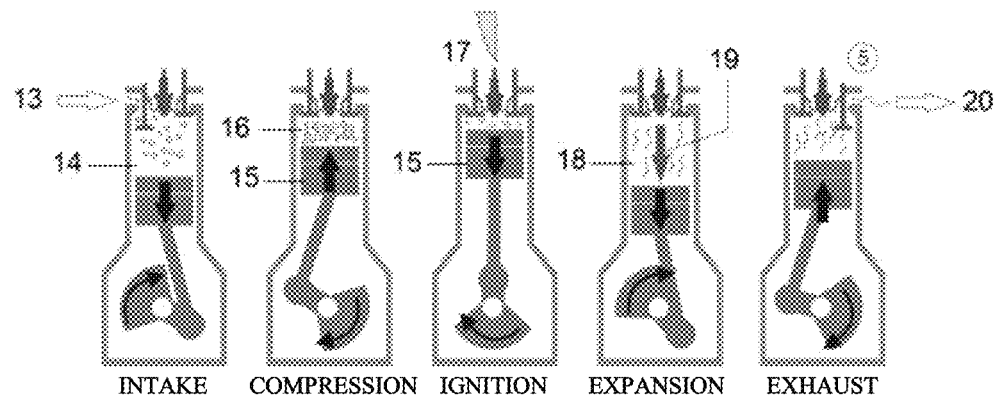
Figure 14:
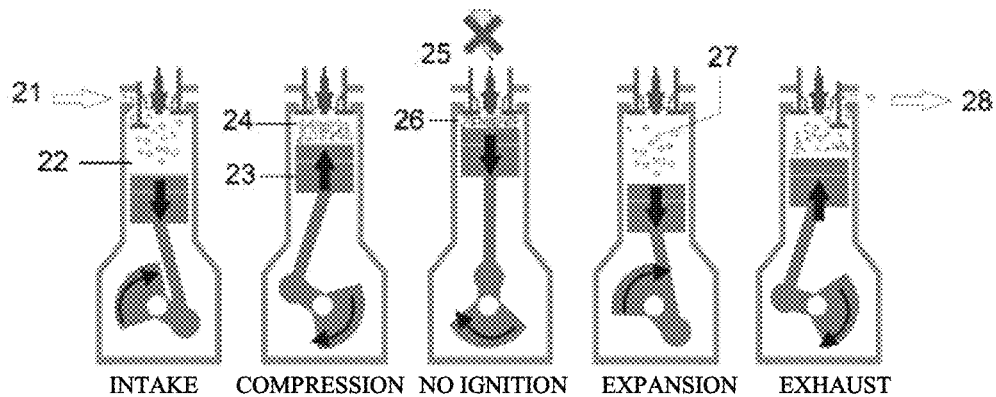
Figure 15:
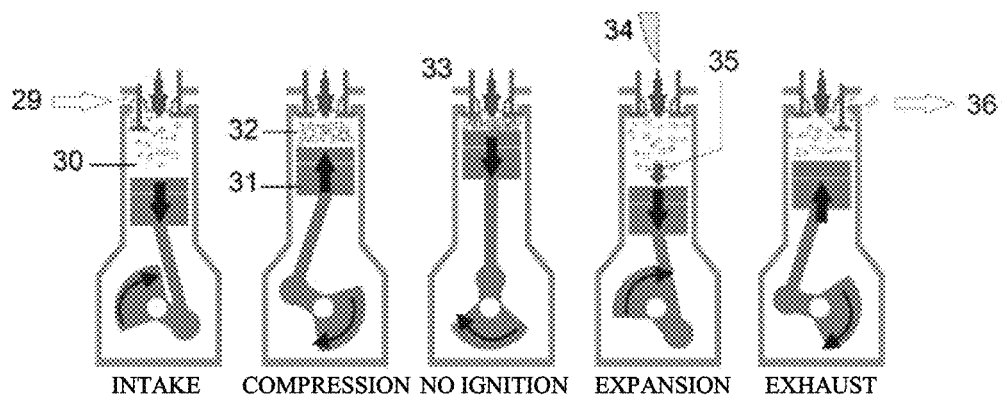
Figure 16:
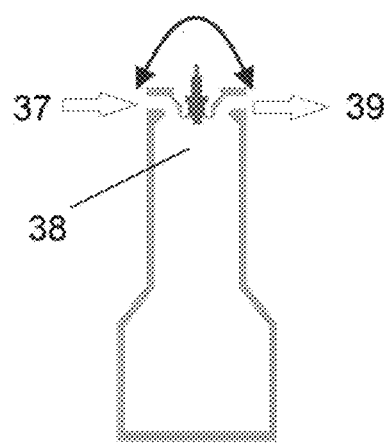
Figure 17:
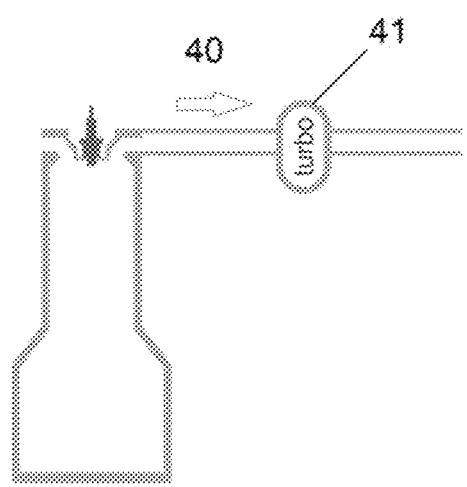
Figure 17:
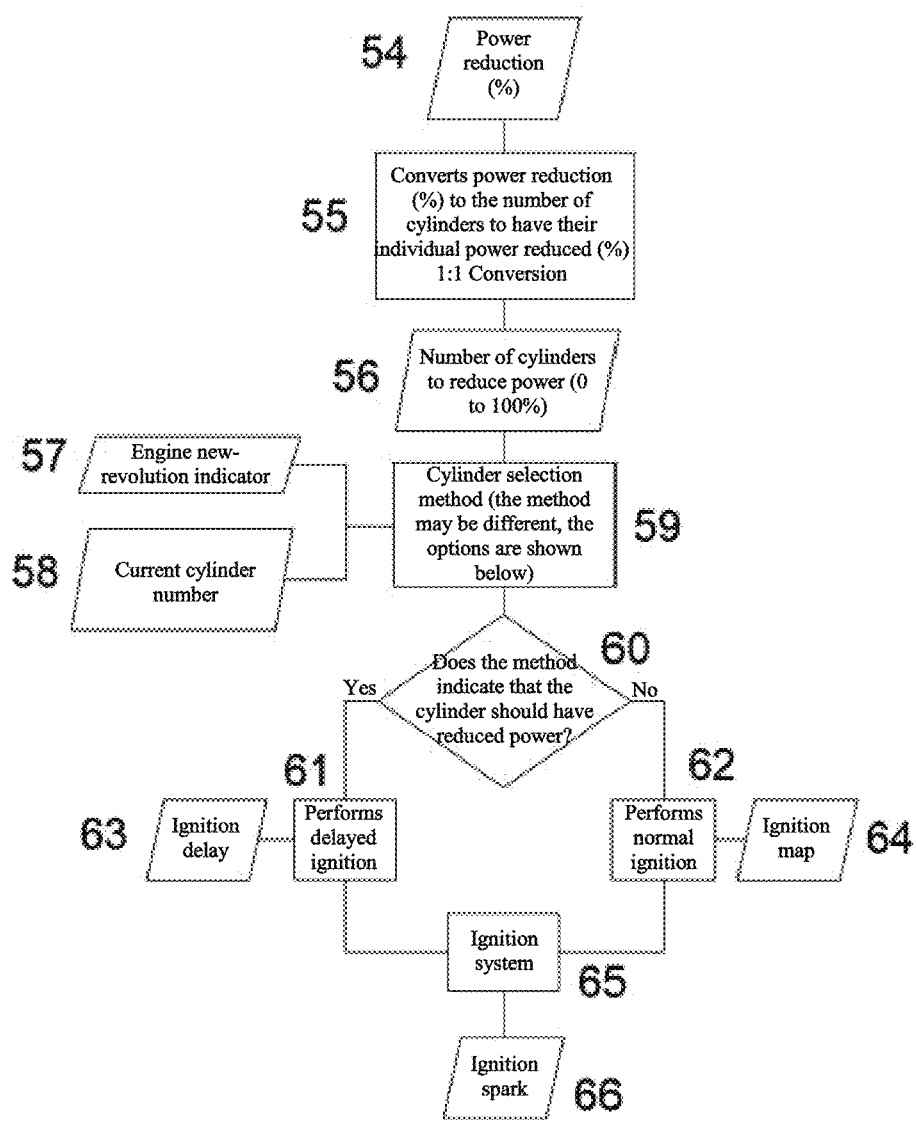
Figure 17:
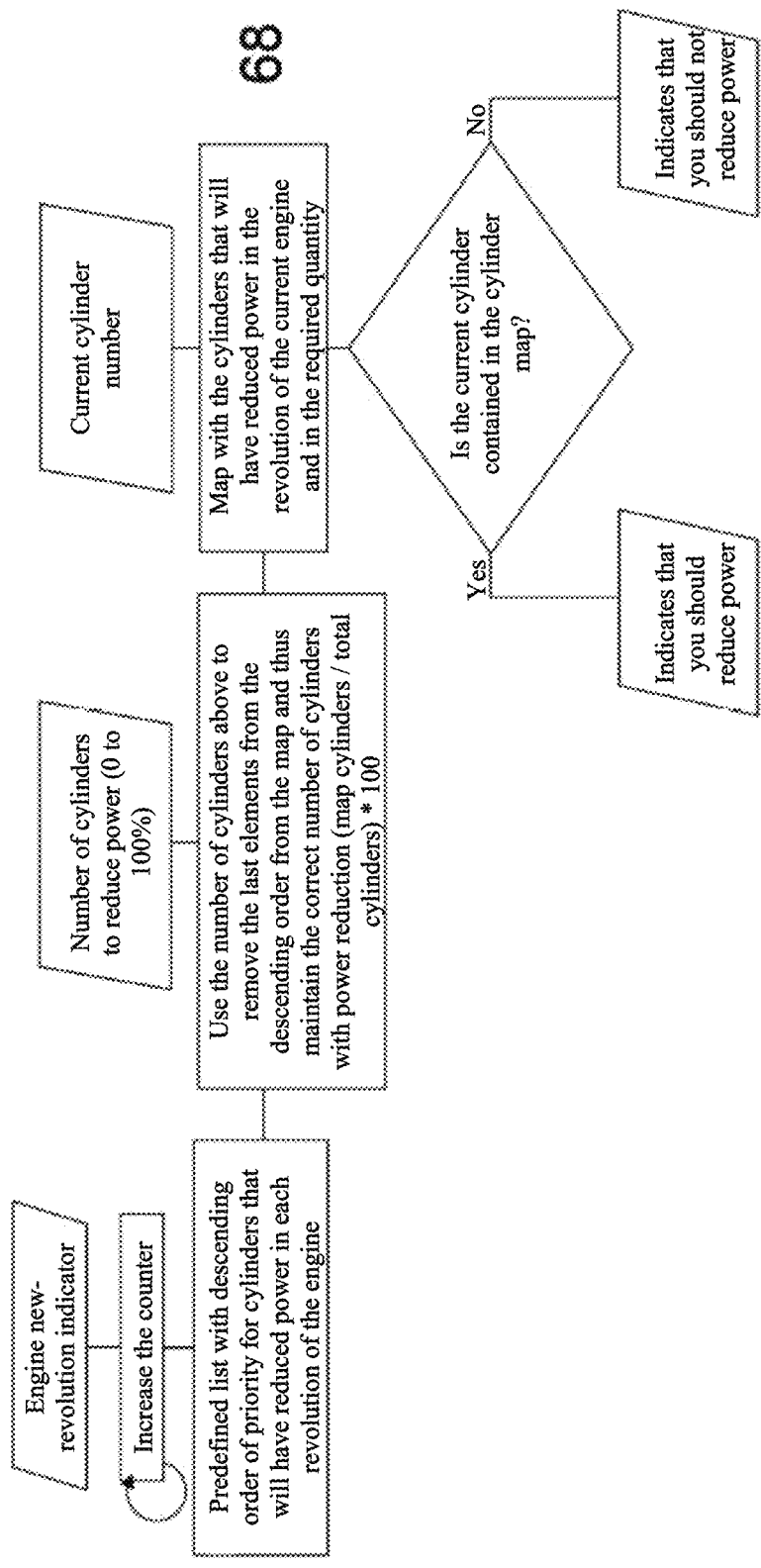
Figure 17:
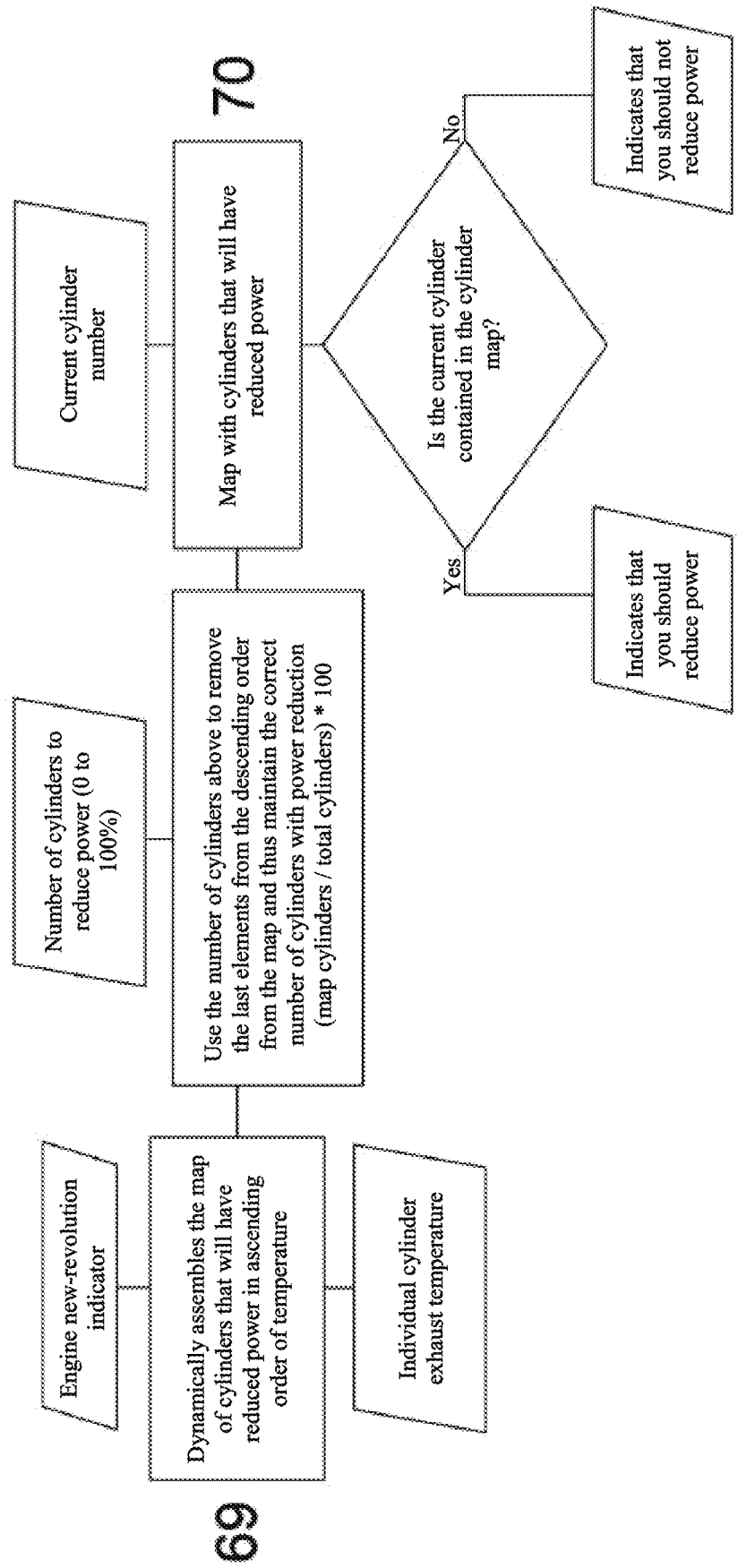
Figure 17:
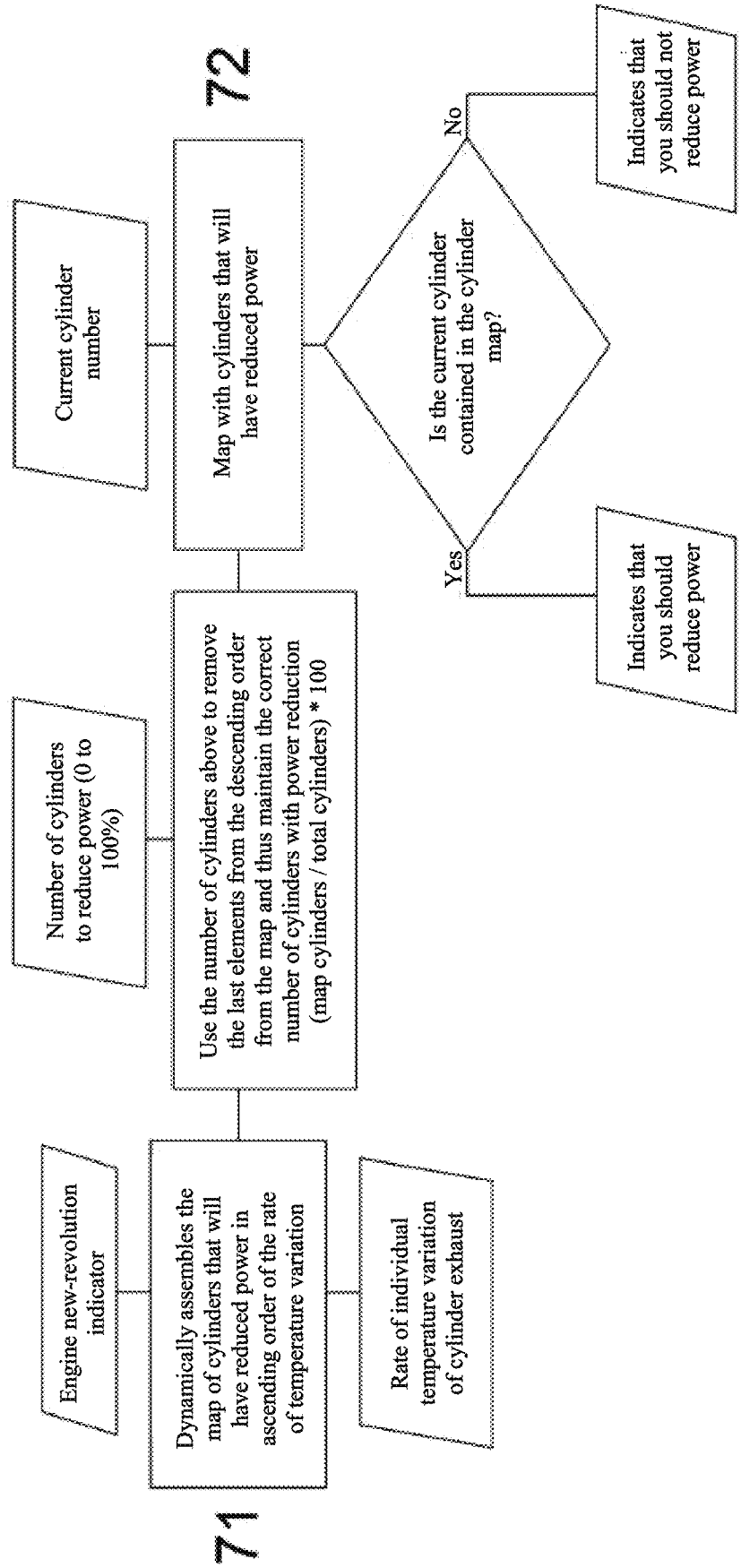
Figure 17:
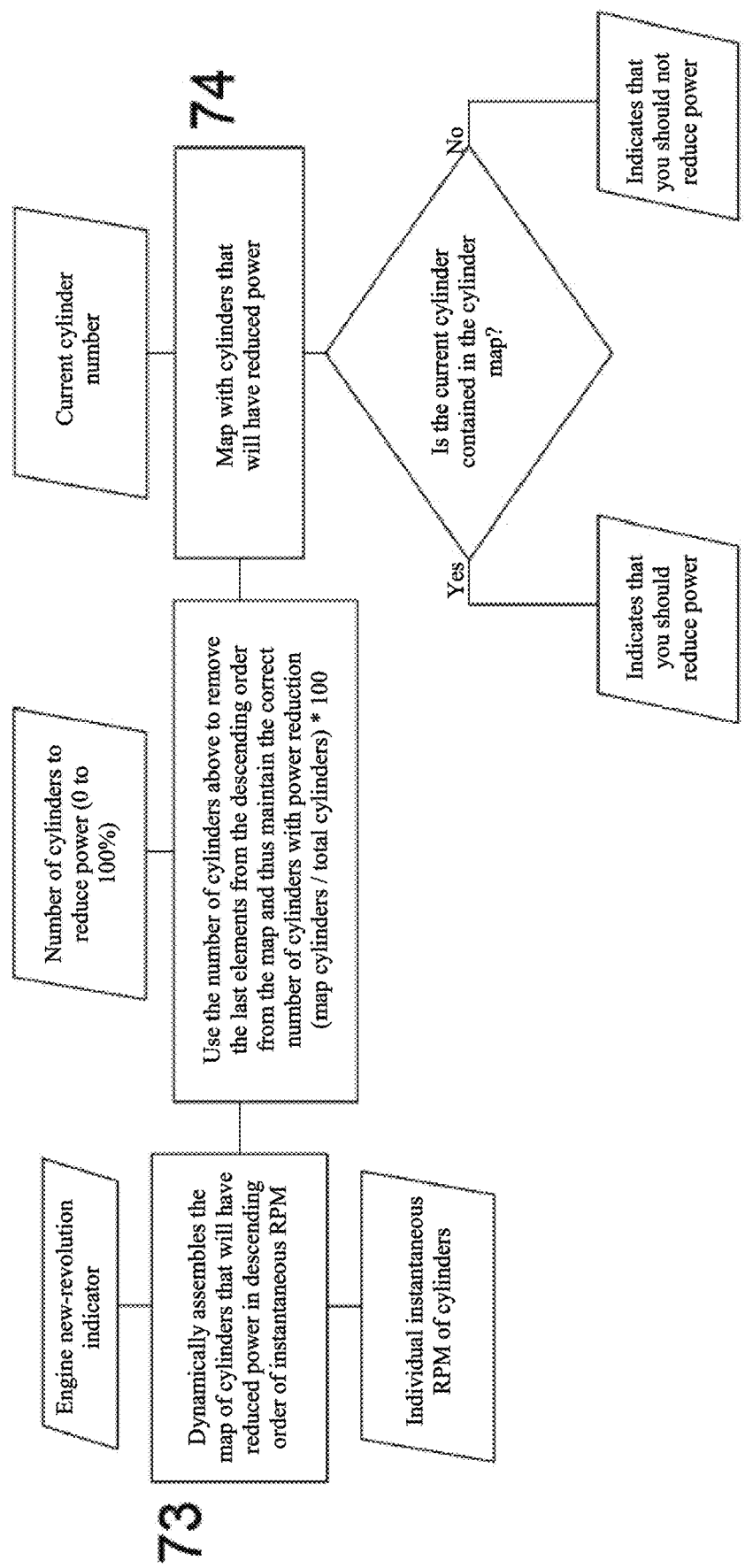
Figure 19:
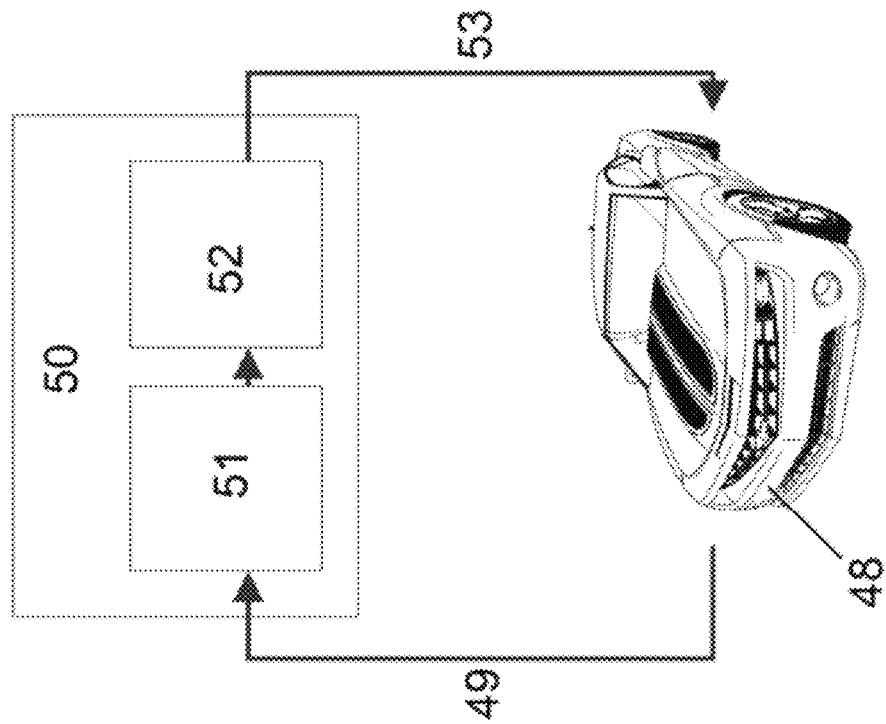
Figure 18:
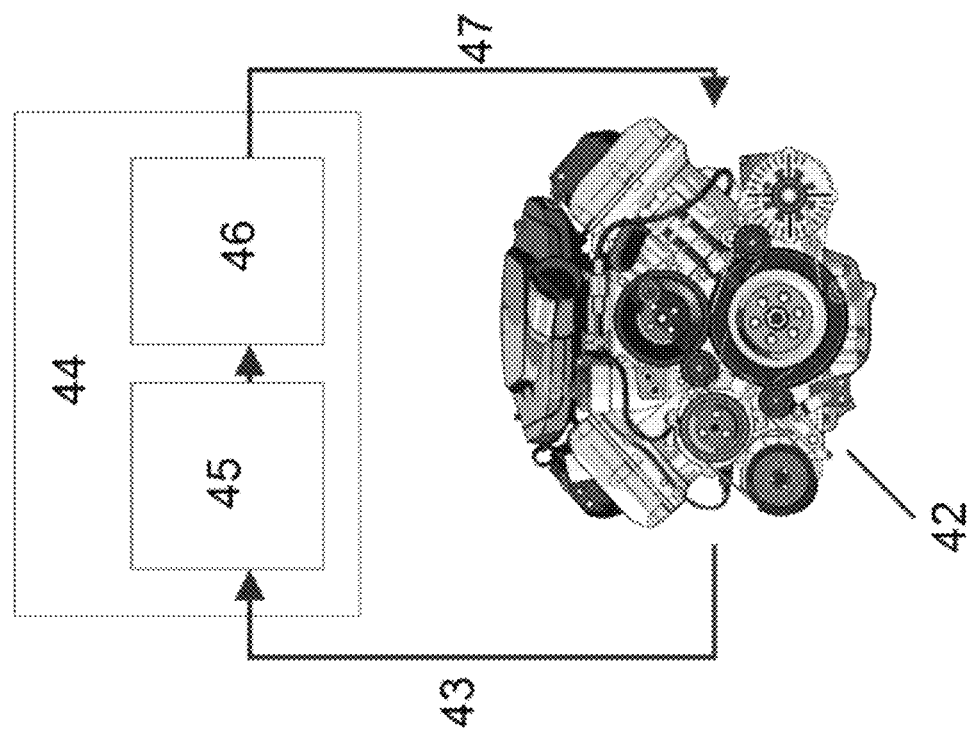
Figure 20:
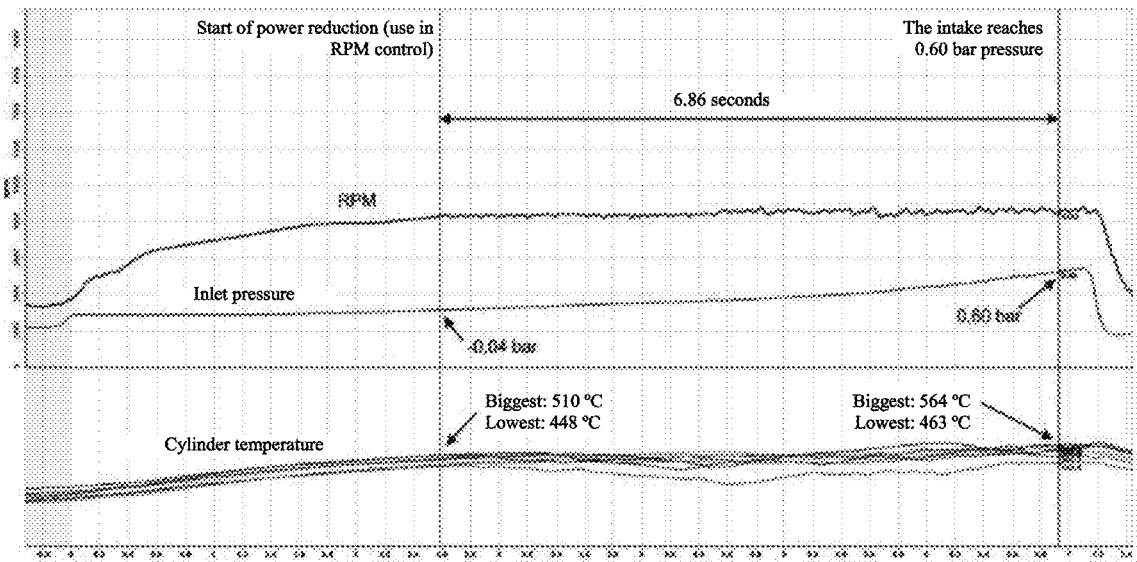
Figure 21:
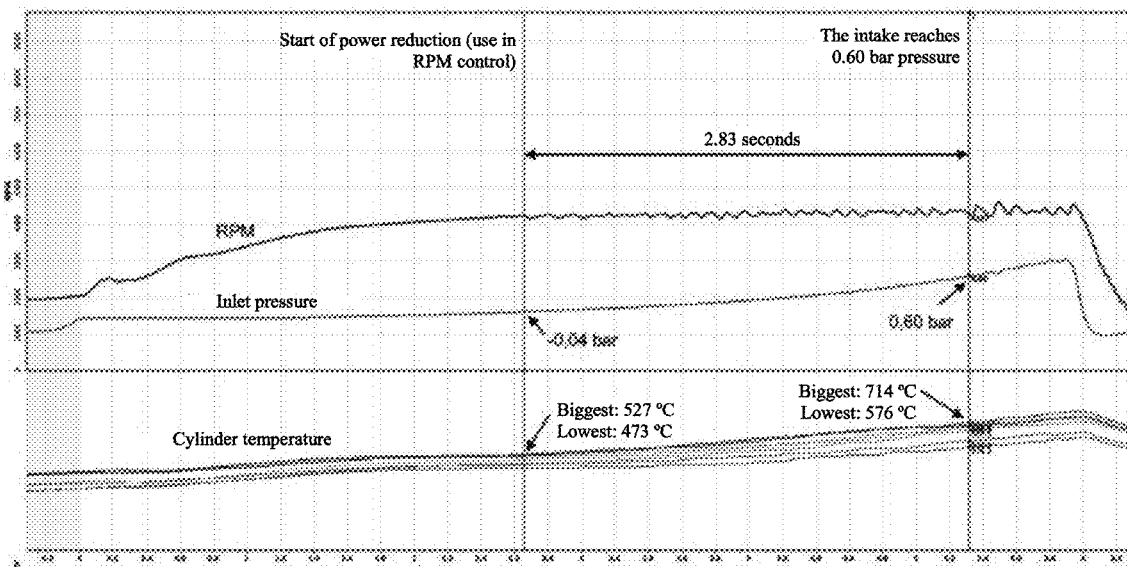
Figures 21, 22:
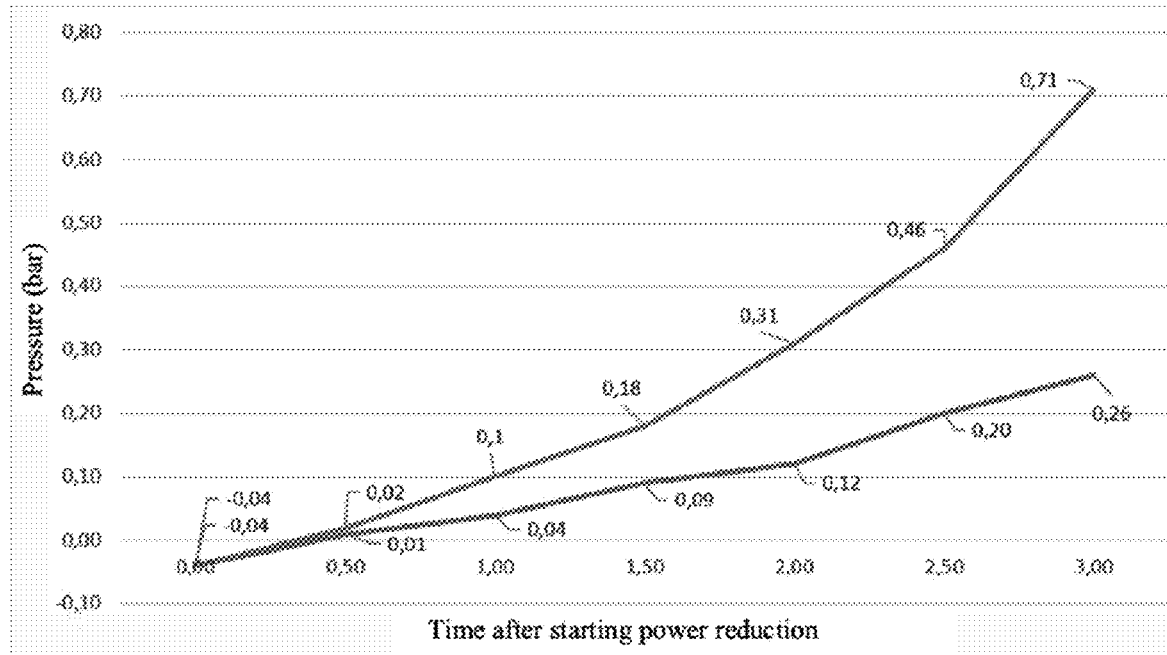
Figures 22, 23:
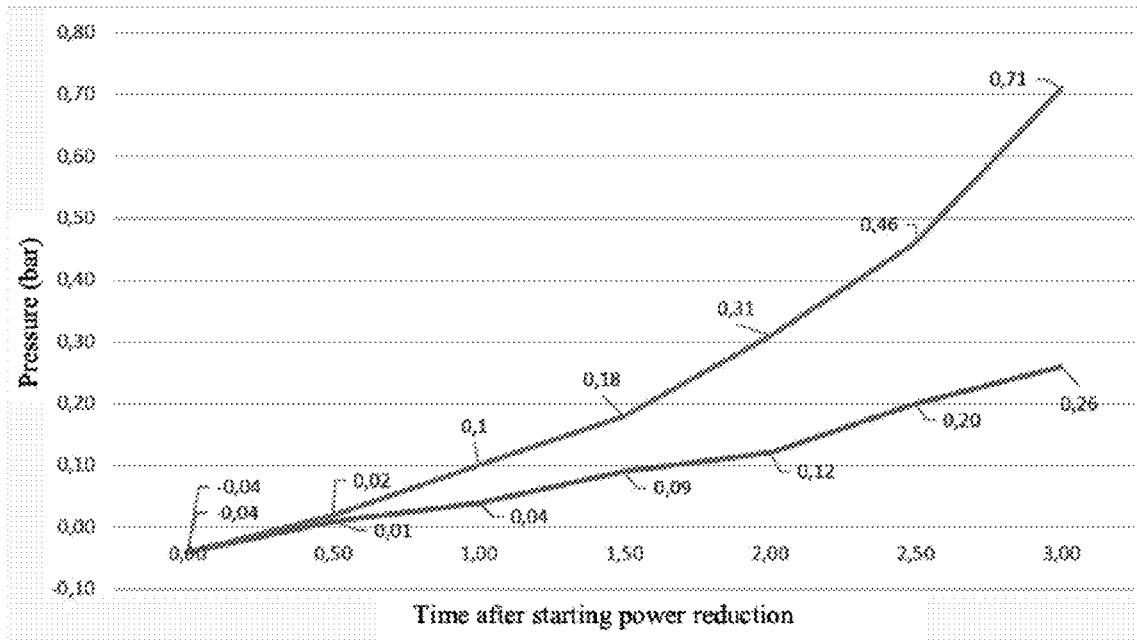

FIG. 11 show the cut-off power reduction method on a four-cylinder engine and the high-resolution power cut-off method on a four-cylinder engine of the state of the art;

FIG. 12 show a comparison between the cut-off power reduction method on a four-cylinder engine and the high-resolution power cut-off method on a four-cylinder engine of the invention;

FIG. 13 show the normal ignition process;

FIG. 14 show the cut-off ignition process;

FIG. 15 show the delayed ignition process;

FIG. 16 shows the impact of the combustion temperature difference on normally aspirated engines;

FIG. 17 shows the impact of expanding gases in the exhaust of supercharged engines;

FIG. 17A shows the proposed method;

FIG. 17B shows the selection of cylinders by randomization;

FIG. 17C shows the sequential cylinder selection;

FIG. 17D shows the selection of predefined cylinders;

FIG. 17E shows the cylinder selection by exhaust temperature;

FIG. 17F shows the selection of cylinders by rate of change in the exhaust temperature;

FIG. 17G shows the selection of cylinders by the highest instantaneous RPM (highest angular speed);

FIG. 18 shows an example of using the method to control RPM;

FIG. 19 shows an example of using the method for speed control;

FIG. 20 shows the preparation process for the start with the ignition cut-off method;

FIG. 21 shows the preparation process for the start with the ignition delay method;

FIG. 21A is a comparison of results in the pressurization of the intake;

FIG. 22 shows the pressure (bar) over time, after the start of the power reduction;

FIG. 22A is a comparison of the temperature result of the cylinders and;

FIG. 23 shows the temperature over time, after the start of the power reduction.

In FIGS. (1) and (2), it is possible to verify how the cylinders actuation in the cut-off method (1) and in the proposed method (2) occurs. In (1), it can be seen that the method's action consists of not performing the ignition, thus leaving the cylinder without generating power. In (2), the performance of the power reduction occurs through the delay at the moment of ignition, where the power of the cylinder is not totally reduced. In (2), it can be noted that the engine receives power generation continuously, there is no moment where the movement of the pistons occurs only by inertia, as in (1).

From the power resulting from (1) and (2), it is possible to plot the ignition cut-off method (3) and ignition delay/proposed method (4). In these, it is important to verify that the same average power is achieved, since the high resolution method (4) acts on more cylinders than the cut-off method (3), considering the same period of time. In addition, it is important to note that in the image method (4), there is less variation in power being exerted on the engine.

The cut-off method (5) and delay method (6) charts show the differences in energy use between the methods.

In (5), as will be explained later in this document, the engine suffers a temperature drop, when air and fuel are not burned in the ignition method, this temperature drop is quite harmful to the correct functioning of high thermal grade spark plugs. It can be noted that the engine temperature only increases when the fuel actually burns.

In (6), it is possible to verify how the new method manages to constantly heat up the engine because there is always ignition. Also, it will be demonstrated later, how the gases resulting from the delayed ignition are able to heat up more the engine when compared to gases of a normal ignition.

FIG. 7 (cut-off method) and FIG. 8 (delay method) show the increase in turbocharger pressurization over time. Due to the reuse of exhaust gases from delayed ignition, the new method is able to perform pressurization in less time than the cut-off method.

In FIGS. (9), (10), (11) and (12) the method proposed in this document (10 and 12) is compared with another traditional generalized ignition point delay technique (9 and 11) in all cylinders, where to reduce the overall engine power an intermediate delay is applied to all cylinders, without instantaneous variations for the next ignition event. In this traditional delay method (10 and 11), the response to changes in control is slower, requiring complete revolutions of the engine to change the power generation and the balance between the work generated to accelerate the engine (work done inside the combustion chamber) and the work to start the turbocharger (work performed on the exhaust duct) has a very sensitive range that does not allow precise control of the desired engine speed and at the same time is not highly efficient in increasing the speed of the turbocharger as it cannot shift work to the exhaust cycle in high volume, as it is committed to keeping the engine accelerating.

In the normal ignition process (FIG. 13) occur in the following steps:

Air and vaporized fuel (13) enter the combustion chamber (14) of the cylinder;

The piston (15) compresses the air and fuel (16) increasing the internal pressure in the combustion chamber;

The ignition spark (17) starts the combustion process where expanding gases are created, which push the piston (15) and thus generating power in the engine;

The expanding gases (18) continue to push the piston and generate work (19);

The gases resulting from combustion are expelled by the exhaust valve (20), already with reduced pressure.

In the ignition cut-off process (FIG. 14) the following steps occur:

Air and vaporized fuel (21) enter the cylinder combustion chamber (22);

The piston (23) compresses the air and fuel (24) increasing their pressure;

The ignition spark does not occur (25), keeping the gases in the combustion chamber (26) unchanged, drastically lowering the temperature of the spark plug and combustion chamber;

The inertia of the engine causes the piston to move without generating work (27). At this time, the engine loses power as there are no expanding gases helping the piston move, causing increased engine vibration;

Air and fuel are expelled through the exhaust valve (28). These gases cool the engine because they are at a lower temperature and do not contribute to work In the proposed delayed ignition process (FIG. 15) in this invention the following steps occur:

Air and vaporized fuel (29) enter the combustion chamber of the cylinder (30);

The piston (31) compresses the air and fuel (32) increasing their pressure;

The ignition spark does not occur (33), keeping the gases in the combustion chamber unchanged;

The inertia of the engine causes the piston to move. Soon after, the ignition spark (34) occurs, the generation of work in this case is reduced (35), since the piston is already at the end of its excursion.

Air and fuel still expanding are expelled through the exhaust valve (36). These gases continue to expand as they exit the cylinder. This expansion dramatically accelerates the flow of gases in the exhaust. The temperature of the gases is also higher in this case, as combustion is still taking place when leaving the cylinder, this causes the exhaust temperature to be higher, in the same way as that of the cylinder.

FIG. 16 shows the impact of the combustion temperature difference in normally aspirated engines, with the temperature difference between the cold air and fuel inlet (37) in the combustion chamber (38) and the hot air and fuel outlet, still burning and expanding (39).

FIG. 17 shows the impact of expanding gases in the exhaust of supercharged engines, where hot air and fuel, still burning and expanding (40) are directed to the turbocharger (41), so that the gases in greater speed make the blades of the turbocharger (41) rotate faster, which causes pressure increase.

In FIG. 18, the proposed method is used to control the RPM of an engine (42), where an RPM signal (43) is sent to the Engine Control Unit, ECU (44), which controls the RPM (45) that establishes the power reduction (46), with sending signal to the ignition (47).

In FIG. 19, the proposed method is used to control the speed of a vehicle (48), where a signal of the speed of the wheels (49) is sent to the Engine Control Unit, ECU (50), which controls the speed (51) and establishes the power reduction (52), with signal for ignition (53).

Among the advantages of the new method, the following can be mentioned:

All cylinders burn fuel, ensuring that the cylinders and spark plugs will be at an adequate temperature. In this way, a drop in performance is avoided due to the low temperature in the cylinder, especially in the spark plugs used in extreme performance applications;

There is a progression of how much power the cylinder will generate, the method allows the adjustment from 0 to 100% of energy generation per cylinder, this way the control is with a higher resolution;

The cylinders that are generating little power have as a by-product the exhaustion of expanding gases, which dramatically accelerates the pressurization of the turbochargers and contributes to the reduction of the delay (LAG) characteristic of these systems;

The engine is constantly receiving work, as all cylinders generate power;

The variation of the high frequency ignition point between the normal advance required by the engine (advance point that generates power for the engine to accelerate) and the extremely delayed ignition point (generates work on the exhaust duct) generates stability and tensioning in the engine operation, causing a much more stable control at the desired speed.

FIGS. 20 and 21 show real data from a racing vehicle that is in the run-up to the start phase. FIG. 20 uses the traditional ignition cut-off method, while FIG. 21 presents the new method. It is possible to verify that in the new logic, the inlet pressure reaches 0.6 bar using 4.03 seconds less than in the cut-off logic. In addition, the temperature of all cylinders is 26% hotter in the same pressure situation (0.6 bar).

Drawings make it possible to understand that the proposed method works as follows:

The target power (54) is passed to the algorithm together with the normal ignition table (64) and the maximum allowed ignition delay (63);

The target power is converted (55) to a percentage indicating the number of cylinders that must have their individual powers reduced (56);

The cylinder selection method (59) uses the number of cylinders (56), the engine new-revolution indicator (57), and the current cylinder number (58) to indicate whether this cylinder should have its power reduced;

The result of the cylinder selection method (60) is then received by the ECU ignition system (65). If power reduction is required, the delayed (61) ignition (66) is performed using the ignition delay setting (63). If the reduction is not necessary, the ignition (66) is normally carried out (62) using the normal ignition point (64).

The cylinder selector system (60) is responsible for choosing which cylinders will receive the delayed ignition point or the normal table point. The number of cylinders in each state will depend on the amount of power to be reduced, the greater the power reduction, the more cylinders will receive the point delay. The choice of cylinders can occur in several ways: FIG. 17B shows the selection of cylinders by randomization; FIG. 17C shows the sequential cylinder selection; FIG. 17D shows the selection of predefined cylinders; FIG. 17E shows the cylinder selection by exhaust temperature; FIG. 17F shows the cylinder selection by rate of exhaust temperature change and FIG. 17G shows the cylinder selection by higher instantaneous RPM (higher angular velocity).

EXAMPLE 01

Example of the predefined selection on a 6-cylinder engine (flowchart 4).
Predefined list (67) with descending order of priority for cylinders that will have reduced power in each revolution of the engine:
Revolution 1: 1.2, 3, 4, 5 and 6;
Revolution 2: 6, 5, 4, 3, 2 and 1;
Revolution 3: 3, 4, 5, 6, 1 and 2;
Revolution 4: 2, 1, 6, 5, 4 and 3.
On revolution 1 of the engine and with 50% of cylinders to reduce power.
Map with 100% of cylinders: 1, 2, 3, 4, 5 and 6.
Final map (68) with 50% of cylinders: 1, 2 and 3.
On revolution 2 of the engine and with 50% of cylinders to reduce power.
Map with 100% of cylinders: 6, 5, 4, 3, 2 and 1.
Final map (68) with 50% of cylinders 6, 5 and 4.
On revolution 3 of the engine and with 20% of cylinders to reduce power.
Map with 100% of cylinders: 3, 4, 5, 6, 1 and 2.
Final map (68) with 20% of the cylinders: 3.
On revolution 4 of the engine and with 35% of cylinders to reduce power.
Map with 100% of cylinders: 2, 1, 6, 5, 4 and 3.
Final map (68) with 35% of cylinders 2 and 1.

EXAMPLE 02

Example of temperature selection on a 6-cylinder engine (FIG. 17E):
Individual cylinder exhaust temperature:
Cylinder 1: 100° C.;
Cylinder 2: 110° C.;
Cylinder 3: 120° C.;
Cylinder 4: 130° C.;
Cylinder 5: 140° C.; and
Cylinder 6: 150° C.
Number of cylinders to reduce power: 50%.
List (69) dynamically mounted on the first engine revolution.
Map with 100% of the cylinders (69): 1, 2, 3, 4, 5 and 6.
Final map (2) with 50% of cylinders: 1, 2 and 3.
Exhaust temperature of the cylinders on the next revolution:
Cylinder 1: 130° C.;
Cylinder 2: 140° C.;
Cylinder 3: 150° C.;
Cylinder 4: 130° C.;
Cylinder 5: 140° C.; and
Cylinder 6: 150° C.
Number of cylinders to reduce power: 50%.
List (69) dynamically prepared on the next engine revolution.
Map with 100% of cylinders (1):1, 4, 2, 5, 3 and 6.
Final map (70) with 50% of the cylinders: 1, 4 and 2.

EXAMPLE 03

Example of the selection by rate of temperature variation in a 6-cylinder engine (flowchart 6):
Rate of change in the exhaust temperature of the cylinders:
Cylinder 1: 10° C./s;
Cylinder 2: 20° C./s;
Cylinder 3: 30° C./s;
Cylinder 4: 40° C./s;
Cylinder 5: 50° C./s and;
Cylinder 6: 60° C./s.
Number of cylinders to reduce power: 70%.
List (71) dynamically mounted on the first engine revolution.
Map with 100% of the cylinders (71): 1, 2, 3, 4, 5 and 6.
Final map (72) with 70% of cylinders: 1, 2, 3 and 4.

EXAMPLE 04

Example of instantaneous RPM selection on a 6-cylinder engine (flowchart 7):
Instantaneous RPM of cylinders:
Cylinder 1: 1,500 RPM;
Cylinder 2: 1,400 RPM;
Cylinder 3: 1,300 RPM;
Cylinder 4: 1,200 RPM;
Cylinder 5: 1,100 RPM and;
Cylinder 6: 1,000 RPM.
Number of cylinders to reduce power: 70%.
List (73) dynamically mounted on the first engine revolution.
Map with 100% of the cylinders (73): 6, 5, 4, 3, 2 and 1.
Final map (74) with 70% of cylinders: 6, 5, 4 and 3.

The invention claimed is:

1. High resolution method for power control of an internal combustion engine characterized by
  altering the time when the ignition spark happens (ignition point),
  changing it after the maximum compression point of the cylinder (PMS—Upper Dead Center),
  applying this delay differently for each engine cylinder, according to such way that the method chooses, in real time, just before the ignition, whether the next cylinder should have its power reduced or not, this choice being made at high speed and individualized by cylinder.

2. Power control method, according to claim 1 characterized by the following steps:
  air and vaporized fuel (29) enter the combustion chamber of the cylinder (30);
  the piston (31) compresses the air and fuel (32) increasing their pressure;
  the ignition spark does not occur (33), keeping the gases in the combustion chamber unchanged;
  the inertia of the engine causes the piston to move, where the ignition spark (34) occurs shortly thereafter, with reduced work generation (35);
  air and fuel still expanding are expelled through the exhaust valve (36).

3. Power control method, according to claim 1 and characterized by the operation taking place as follows:
  the target power (54) is passed to the algorithm together with the normal ignition table (64) and the maximum allowed ignition delay (63);
  the target power is converted (55) to a percentage indicating the number of cylinders that must have their individual powers reduced (56);
  the cylinder selection method (59) uses the number of cylinders (56), the engine restart indicator (57), and the current cylinder number (58) to indicate whether this cylinder should have its power reduced;

the result of the cylinder selection method (60) is then received by the ECU ignition system (65);

if power reduction is required, the delayed (61) ignition (66) is performed using the ignition delay setting (63);

if the reduction is not necessary, the ignition (66) is normally carried out (62) using the normal ignition point (64).

4. Power control method, according to claim 1 and characterized by the cylinder selector system being responsible for choosing which cylinders will receive the delayed ignition point or the normal table point, where the number of cylinders in each state of the art will depend on the amount of power to be reduced, so that the greater the power reduction, the more cylinders will receive the point delay.

5. Power control method, according to claim 1 and characterized by the choice of cylinders to occur in the following ways: selection of cylinders by randomization, selection of sequential cylinders, selection of predefined cylinders, selection of cylinders by exhaust temperature, cylinder selection by rate of exhaust temperature change and cylinder selection by higher instantaneous RPM (higher angular velocity).

* * * * *